United States Patent
Warner et al.

(10) Patent No.: US 9,779,397 B2
(45) Date of Patent: *Oct. 3, 2017

(54) TRANSACTIONAL SYSTEM AND METHOD FOR A TABLE GAME

(71) Applicant: AUTOMATED CASHLESS SYSTEMS, INC., Reno, NV (US)

(72) Inventors: Stephen L. Warner, Zephyr Cove, NV (US); Shawn Quick, Reno, NV (US)

(73) Assignee: AUTOMATED CASHLESS SYSTEMS, INC., Reno, NV (US)

( * ) Notice: Subject to any disclaimer, the term of this patent is extended or adjusted under 35 U.S.C. 154(b) by 151 days.

This patent is subject to a terminal disclaimer.

(21) Appl. No.: 14/710,109

(22) Filed: May 12, 2015

(65) Prior Publication Data
US 2015/0339654 A1    Nov. 26, 2015

Related U.S. Application Data

(60) Continuation-in-part of application No. 14/588,936, filed on Jan. 3, 2015, which is a division of
(Continued)

(51) Int. Cl.
*G06F 17/00* (2006.01)
*G06Q 20/32* (2012.01)
(Continued)

(52) U.S. Cl.
CPC ......... *G06Q 20/325* (2013.01); *G06Q 20/027* (2013.01); *G06Q 20/0453* (2013.01);
(Continued)

(58) Field of Classification Search
CPC .. G06Q 20/027; G06Q 20/1085; G06Q 20/18; G06Q 20/204; G06Q 20/206; G07F 17/32; G07F 19/20
(Continued)

(56) References Cited

U.S. PATENT DOCUMENTS 5,557,086 A    9/1996    Schulze et al.
6,304,860 B1    10/2001    Martin et al.
(Continued)

FOREIGN PATENT DOCUMENTS

GB    2461975 A    10/2010
KR    20-0291099000    10/2002
(Continued)

*Primary Examiner* — Michael Cuff
(74) *Attorney, Agent, or Firm* — Kerr IP Group, LLC (57) ABSTRACT

A transactional system and method for a table game is described. The transactional system includes a controller, a printer, a wireless device and a payment gateway. The controller is communicatively coupled to the printer and the combination is associated with the table game. The wireless device is communicatively coupled to the controller and receives at least one transactional input that initiates a transaction from the wireless device. The controller communicates the transactional data to payment gateway and then receives an authorization response from the payment gateway for an approved transaction. The controller communicates the authorization response to the wireless device, which presents a receipt for the approved transaction at the wireless device. The controller also communicates the authorization response to the printer, which generates an indicia of value. The indicia of value is converted to at least one casino chip at the table game.

20 Claims, 7 Drawing Sheets

Related U.S. Application Data application No. 14/210,450, filed on Mar. 14, 2014, now Pat. No. 8,979,643, which is a continuation of application No. 13/156,444, filed on May 30, 2008, now Pat. No. 7,690,562.

(60) Provisional application No. 61/992,221, filed on May 13, 2014.

(51) Int. Cl.

| | |
|---|---|
| G06Q 20/40 | (2012.01) |
| G06Q 20/04 | (2012.01) |
| G07F 17/32 | (2006.01) |
| G07F 17/42 | (2006.01) |
| G06Q 20/10 | (2012.01) |
| G06Q 20/02 | (2012.01) |
| G06Q 40/02 | (2012.01) |
| G06Q 50/34 | (2012.01) |
| G06Q 20/20 | (2012.01) |
| G07F 7/10 | (2006.01) |

(52) U.S. Cl.
CPC ......... *G06Q 20/10* (2013.01); *G06Q 20/1085* (2013.01); *G06Q 20/202* (2013.01); *G06Q 20/204* (2013.01); *G06Q 20/206* (2013.01); *G06Q 20/209* (2013.01); *G06Q 20/401* (2013.01); *G06Q 40/02* (2013.01); *G06Q 50/34* (2013.01); *G07F 7/10* (2013.01); *G07F 17/322* (2013.01); *G07F 17/3223* (2013.01); *G07F 17/3225* (2013.01); *G07F 17/3248* (2013.01); *G07F 17/3251* (2013.01); *G07F 17/42* (2013.01)

(58) Field of Classification Search
USPC .............................................. 463/25, 29, 42
See application file for complete search history.

(56) References Cited

U.S. PATENT DOCUMENTS

| | | |
|---|---|---|
| 6,511,377 B1 | 1/2003 | Weiss |
| 6,547,131 B1 | 4/2003 | Foodman et al. |
| 6,793,134 B2 | 9/2004 | Clark |
| 6,890,258 B2 | 5/2005 | Weiss |
| 6,997,807 B2 | 2/2006 | Weiss |
| 7,004,837 B1 | 2/2006 | Crowder et al. |
| 7,217,190 B2 | 5/2007 | Weiss |
| 7,232,371 B2 | 6/2007 | Gatto et al. |
| 7,780,526 B2 | 8/2010 | Nguyen |
| 7,819,742 B2 | 10/2010 | Chamberlain et al. |
| 7,844,255 B2 | 11/2010 | Petrov et al. |
| 7,857,207 B1 | 12/2010 | Hopkins |
| 8,715,066 B2 | 5/2014 | Prather et al. |
| 8,968,075 B2 | 3/2015 | Warner |
| 8,979,642 B2 | 3/2015 | Warner |
| 8,979,643 B2 | 3/2015 | Warner |
| 8,979,644 B2 | 3/2015 | Warner |
| 2002/0032656 A1* | 3/2002 | Chen .................. G06Q 20/1085 705/43 |
| 2003/0003996 A1 | 1/2003 | Nguyen et al. |
| 2003/0073494 A1* | 4/2003 | Kalpakian ............... G07F 17/32 463/42 |
| 2003/0083127 A1 | 5/2003 | Weiss |
| 2003/0087692 A1 | 5/2003 | Weiss |
| 2003/0145205 A1 | 7/2003 | Sarcanin |
| 2004/0087360 A1 | 5/2004 | Chamberlain et al. |
| 2004/0093309 A1 | 5/2004 | Nakamura et al. |
| 2004/0147309 A1 | 7/2004 | Chamberlain et al. |
| 2004/0253979 A1 | 12/2004 | Burr |
| 2005/0090308 A1 | 4/2005 | Weiss |
| 2005/0097017 A1 | 5/2005 | Hanratty |
| 2005/0107155 A1 | 5/2005 | Potts et al. |
| 2005/0107156 A1 | 5/2005 | Potts et al. |
| 2005/0266919 A1 | 12/2005 | Rowe et al. |
| 2006/0160610 A1 | 7/2006 | Potts |
| 2006/0172798 A1 | 8/2006 | Crowder et al. |
| 2006/0205481 A1 | 9/2006 | Dominelli |
| 2006/0218091 A1 | 9/2006 | Choy |
| 2007/0225068 A1 | 9/2007 | Weiss |
| 2007/0246531 A1 | 10/2007 | Dabrowski |
| 2007/0282858 A1 | 12/2007 | Arner et al. |
| 2008/0015014 A1 | 1/2008 | Weiss |
| 2008/0113776 A1 | 5/2008 | Sommer |
| 2008/0139303 A1 | 6/2008 | Patterson |
| 2008/0153583 A1 | 6/2008 | Huntley et al. |
| 2008/0242403 A1 | 10/2008 | Weiss |
| 2009/0005157 A1 | 1/2009 | Netley et al. |
| 2009/0005159 A1 | 1/2009 | Netley et al. |
| 2009/0099965 A1 | 4/2009 | Grant, IV |
| 2009/0131146 A1 | 5/2009 | Arezina et al. |
| 2009/0138369 A1 | 5/2009 | Raja |
| 2009/0287524 A1 | 11/2009 | Gnoato |
| 2009/0299848 A1 | 12/2009 | Cao et al. |
| 2009/0305765 A1 | 12/2009 | Walker et al. |
| 2010/0197383 A1 | 8/2010 | Rader et al. |
| 2010/0222132 A1 | 9/2010 | Sanford et al. |
| 2011/0086696 A1 | 4/2011 | MacEwan |
| 2011/0230260 A1 | 9/2011 | Morrow et al. |
| 2012/0142403 A1 | 6/2012 | Prather |
| 2013/0172078 A1 | 7/2013 | Boyd et al. |
| 2014/0094256 A1 | 4/2014 | Hilbert et al. |
| 2014/0194193 A1 | 7/2014 | Warner et al. |
| 2014/0194194 A1 | 7/2014 | Warner |
| 2014/0194195 A1 | 7/2014 | Warner et al. |
| 2014/0200073 A1 | 7/2014 | Warner et al. |
| 2015/0148120 A1 | 5/2015 | Warner et al. |
| 2015/0187177 A1 | 7/2015 | Warner et al. |
| 2016/0027252 A1 | 1/2016 | Warner et al. |

FOREIGN PATENT DOCUMENTS

| | | |
|---|---|---|
| KR | 10-2006-0049945 | 5/2006 |
| WO | 9634345 A1 | 10/1996 |

* cited by examiner

TRANSACTIONAL SYSTEM AND METHOD FOR A TABLE GAME

CROSS REFERENCE

This patent application claims the benefit of provisional patent application 61/992,221 entitled CASHLESS ELECTRONIC FUNDS TRANSACTION PROCESSING SYSTEM filed on May 13, 2014; this patent application is a Continuation-In-Part of patent application Ser. No. 14/588,936 filed on Jan. 3, 2015, which is a divisional of patent application Ser. No. 14/210,456 filed on Mar. 14, 2014 (now U.S. Pat. No. 8,979,643), which is a Continuation of Ser. No. 13/156,444 filed on Jun. 9, 2011 (now U.S. Pat. No. 8,715,066), which claims the benefit of provisional patent application 61/354,339 filed on Jun. 14, 2010, and all the patent applications identified above are incorporated by reference in this patent application filing.

FIELD

The present invention relates to a transactional system and method for a table game. More specifically, the transactional system and method includes a controller that communicates an authorization response to the wireless device that initiated a transaction; the controller also communicates the authorization response to a printer that generates an indicia of value at the table game; and a receipt is also printed at the wireless device.

BACKGROUND

Most casinos provide automated teller machines and cash kiosks for the convenience of their patrons. However, these devices require floor space and often create a queue of patrons waiting in line to use the machines. Generally, these devices are dedicated machines that dispense cash to patrons and are usually located around the periphery of the casino floor. These devices are intended to be operated at one location and are not easily relocated. These devices also force players to travel to the location of the machine.

Additionally, existing unattended cash machines are expensive and may require considerable attention from gaming establishment personnel. Such machines must be continually restocked with large quantities of cash due to the near-continual use by patrons, which may also result in an increased frequency of machine failure.

Casino chips are commonly used at gaming tables in the casino property. Patrons may obtain chips for cash when beginning or continuing play at a table, but such purchases are limited to cash on hand and many players are reluctant to carry a large quantity of cash on their person. Patrons seeking to complete an electronic funds transfer (EFT) must therefore leave their table gaming station and seek out an automatic teller machine (ATM), cash kiosk, or often stand in line at the casino cashier's cage to perform that operation. Further, the patron may only be able to directly receive cash as the result of an electronic funds transfer. To participate in most table games, the patron must then convert the cash into casino chips at either the cashier's cage or at the gaming table. Faced with the inconvenience of completing this two-step process, a patron may decide to stop playing, reducing the entertainment value of his gaming experience while simultaneously reducing revenue for the gaming establishment.

Gaming establishments are highly motivated to accommodate their patrons and increase their playing satisfaction. Therefore, it would be beneficial to provide a secure system that allows gaming patrons to initiate and complete an electronic transfer of funds from a bank or credit account entirely at the point of table game play.

SUMMARY

A transactional system and method for a table game is described below. The transaction system includes a controller, a printer, a wireless device and a payment gateway. The controller is communicatively coupled to the printer. The controller and the printer are associated with at least one table game. The wireless device is communicatively coupled to the controller. The wireless device receives at least one transactional input that initiates a transaction from the wireless device. The wireless device securely communicates transactional data to the controller. The transactional data corresponds to the transaction initiated by the wireless device. The payment gateway is also communicatively coupled to the controller. The payment gateway securely communicates with at least one financial network. The controller securely communicates the received transactional data to the payment gateway. The controller then receives an authorization response from the payment gateway for an approved transaction. The controller communicates the authorization response to the wireless device, which presents a receipt for the approved transaction at the wireless device. Additionally, the controller communicates the authorization response to the printer, which generates an indicia of value that corresponds to the transaction initiated by the wireless device. The indicia of value is converted to at least one casino chip at the table game.

In one illustrative embodiment, the indicia of value is a printed record operating as an indicia of value. Additionally, a printer box houses the printer and the controller. Furthermore, the printer box is located at the table game.

In another illustrative embodiment, the wireless device includes an Electronic Funds Transfer (EFT) terminal that further includes a card reader and a Personal Identification Number (PIN) pad. The card reader reads an electrically encoded card and the PIN pad receives a password corresponding to the electrically encoded card. By way of example and not of limitation, the electrically encoded card is a magnetically encoded card such as a debit card.

In yet another embodiment, the transactional system includes a database module that securely communicates with the controller. The database module logs the transactional data communicated to the payment gateway and the authorization response associated with the approved transaction. Additionally, a server is communicatively coupled to a plurality of table games. The server includes the database module and the server securely communicates with a plurality of controllers, in which each controller is associated with a table game. The database records an approved transaction after the receipt for the approved transaction is generated at the wireless device and after the printer generates the indicia of value corresponding to the transaction.

In a still further embodiment, the printer communicatively coupled to the controller is accessible by a plurality of table games.

FIGURES

The present invention will be more fully understood by reference to the following drawings which are presented for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the transactional system and method described herein may vary as to configuration and as to details. The following detailed description of the illustrative embodiments includes reference to the accompanying drawings, which form a part of this application. The drawings show, by way of illustration, specific embodiments in which the invention may be practiced. It is to be understood that other embodiments may be utilized and structural changes may be made without departing from the scope of the claims.

The transactional system and method permits a gaming patron to initiate and complete a transaction and receive indicia of value such as casino chips at the casino table game. More specifically, the illustrative transactional system and method dispenses a printed record operating as an indicia of value to an attendant of the establishment, such as the dealer or croupier at a gaming table. The printed record operating as an indicia of value is used to provide casino chips that may be used by the player at the casino table game. Thus, the casino guest does not have to leave the gaming table to get additional cash, which would be then be converted to chips at the table. The transactional system and method presented herein operates without having to first receive cash from a conventional EFT process and subsequently convert the cash into casino gaming chips.

In the illustrative embodiment, the transactional system and method presented herein initiates, processes and completes an electronic funds transaction (EFT) in a commercial environment. The transactional system and method may be used as a substitute for an automated teller machine (ATM), cash kiosk, or other such facility capable of completing the desired transaction. The transactional system and method is relatively small and portable, so the transactional system may be easily relocated.

In the illustrative embodiment, the transactional system and method operates at a casino table game. By way of example and not of limitation, the casino table game includes card games such as blackjack (also known as "21"), Poker, Pai Gow, Baccarat, and other such card games. Additional illustrative table games include, but are not limited to, wheel games such as roulette and dice games such as craps, Sic Bo and other such dice games.

In the illustrative embodiment, the transactional system and method does not dispense cash, like a typical Automated Teller Machine (ATM). In another embodiment, the transactional system and method dispenses other indicia of value, e.g. loyalty points or gift cards.

The transactional system and method may be easily relocated, e.g. to a patron's point-of-play, thereby facilitating game play. Additionally, the transactional system and method eliminates the need to restock an unattended machine with cash. Furthermore, the transactional system and method operates with fewer complex mechanical components.

The term "indicia of value" as used herein includes an electronic record, a printed record and a physical token that has a relative worth, i.e. value, to the end user, e.g. customer or patron, and the business or property, e.g. casino. In other words, an electronic record may operate as an indicia of value. Also, a printed record may also operate as an indicia of value.

The indicia of value has a relative worth to the business or property, e.g. casino, and the end user, e.g. patron, in the transactional system and method for a table game that is presented herein.

An "electronic record operating as an indicia of value" is an electronic record that has relative worth to the end user and the business or property. There are a variety of secure communications that communicate an electronic record operating as an indicia of value in the transactional system and method for a table game.

An illustrative electronic record operating as an indicia of value includes the electronic record received from the wireless device, which securely communicates the electronic record to the controller. The controller then proceeds to transmit the electronic record operating as an indicia of value to the payment gateway, which further communicates the electronic record to the financial network or payment processor.

The controller then receives an authorization response from the payment gateway. The authorization response is another electronic record operating as an indicia of value.

The controller proceeds to transmit the authorization response to the wireless device. Again, the transmitted authorization response is an electronic record operating as an indicia of value.

A "receipt" for the approved transaction is presented at the wireless device. A receipt, i.e. payment record, provides a printed record that a payment was received by the business or property, e.g. casino, from the end user, e.g. patron. However, the receipt is not an electronic record and does not have relative worth. In other words, the receipt is a printed record that does not have an indicia of value.

An "electronic record" (by itself) provides electronic or digital evidence that a business activity or transaction took place at a particular time. The electronic record is captured through an electronic or digital process. An electronic record includes a records management solution, which controls the creation, distribution, use, maintenance and disposition of recorded information that is maintained as evidence of business activities or business transactions.

Thus, an electronic record operating as an indicia of value is a subset of an electronic record.

An "electronic record" may include other database attributes that are not specific to the electronic record operating as an indicia of value such as player loyalty information or accumulated loyalty points or player preferences and other such electronic records that are do not correspond to an indicia of value.

A "printed record operating as an indicia of value" is a printed record that has relative worth to the end user and the business or property utilizing the transactional system and method presented herein.

In general, a "voucher" is a printed document that has an indicia of value, which may be exchanged for goods, services, casino chips or any other indicia of value.

A "coupon" entitles the holder of the coupon to a discount for a particular product. A coupon is a type of voucher.

In gaming, the definition of a voucher is more granular because there are a variety of different vouchers including a complete voucher, a duplicate voucher, an incomplete voucher and replacement voucher. A "complete voucher" (in gaming) contains, at a minimum, a complete validation number and is of a quality that can be redeemed through the use of an automated reader or scanner. A "duplicate voucher" is any reprinted complete voucher or incomplete voucher. An "incomplete voucher" contains, at a minimum, the voucher validation number printed across the printed leading edge and is manually redeemable, but is not of a quality that can be redeemed through the use of an automated reader or scanner. A "replacement voucher" is printed following a failed attempt to print a complete or incomplete voucher.

A printed record operating as an indicia of value is different from a complete voucher, a duplicate voucher, an incomplete voucher and replacement voucher; however, the printed record operating as an indicia of value is a type of voucher.

The printed record voucher operates as an indicia of value because it provides a printed record of an "electronic buy in" transaction that can be tracked by the business or property. In the illustrative table game embodiment, the printed record voucher is printed by the illustrative printer when an "electronic buy in" transaction is completed; the dealer accesses the printed record voucher operating as an indicia of value and places the printed record voucher in the table game's cash chute.

The printed record voucher operating as an indicia of value is not a cash equivalent. The printed record voucher operating as an indicia of value may not be redeemed through the use of an automated reader or scanner. Additionally, the printed record voucher operating as an indicia of value may not be manually redeemable.

In the illustrative embodiment, a receipt is generated by the wireless printer. The wireless printer receipt is presented to the end user, e.g. customer or patron. The customer (not the property) is responsible for the receipt. The printed record voucher operating as an indicia of value is distinguishable from the customer receipt because the printed record voucher provides a record of the transaction initiated by the end user, in which the end user received the casino chips, i.e. a physical token operating as an indicia of value, after providing the appropriate "card" information, e.g. PIN.

An illustrative voucher system includes, but is not limited to, a Ticket In Ticket Out (TITO) system. A TITO ticket is an illustrative complete voucher that can be redeemed through the use of automated reader or scanner.

A "physical token operating as an indicia of value" is a physical token that has relative worth to the end user and the business or property. By way of example and not of limitation, casino chips, poker chips and gift cards are illustrative physical tokens operating as an indicia of value.

A "payment gateway" is also referred to interchangeably as the "banking gateway." The payment gateway is configured to communicate with at least one financial network or payment processor. Additionally, the payment gateway is configured to receive an authorization request, which is associated with an approved transaction.

Figure 1:
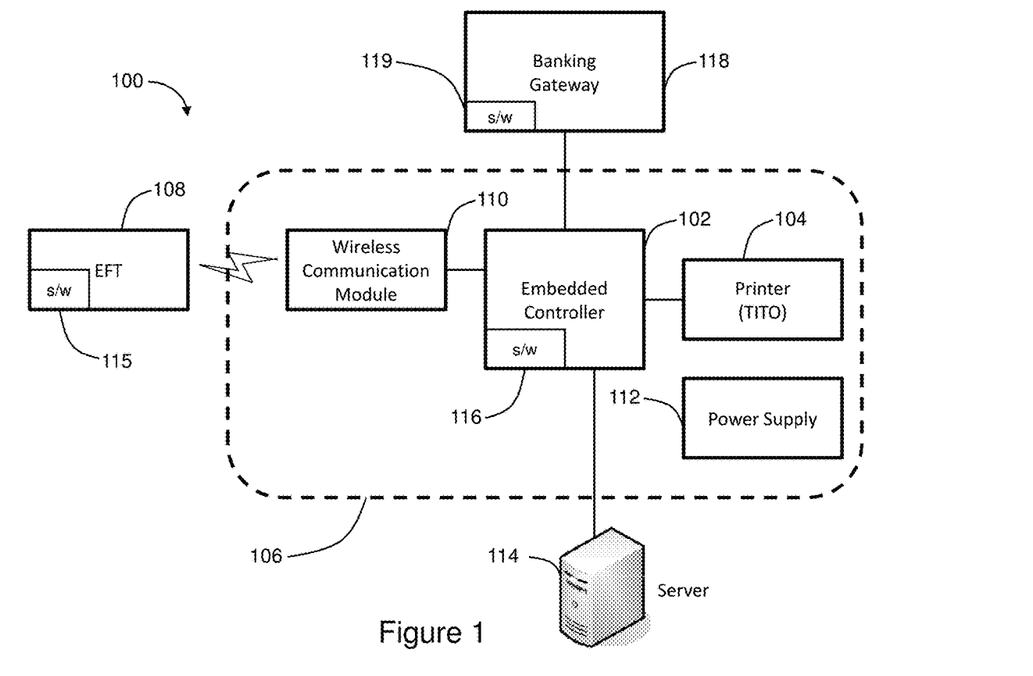
FIG. 1 shows an illustrative transactional system.

Referring to FIG. 1 there is shown an illustrative transactional system 100. The transactional system 100 includes a controller that is communicatively coupled to a printer. By way of example and not of limitation, a hard wire connection is made between an embedded controller 102 and a dedicated printer 104, which generates a printed record operating as an indicia of value. The combination of the embedded controller 102 and Printer 104 is housed in a printer box 106.

By way of example and not of limitation, the embedded controller 102 may be embodied as an ARM based Linux embedded controller with USB and Ethernet connectivity to the printer 104. The illustrative printer 104 may be an Ithaca 950 printer that has a hardwire connection to the embedded controller 102. Alternatively, the printer has a secure wireless connection to the embedded controller 102. More specifically, the embedded controller 102 may be communicatively coupled to the printer 104 using a secure wireless communication channel that operates using a wireless communication protocol such as Wi-Fi, Bluetooth, Zigbee, or other such wireless communication protocol.

In the illustrative embodiment, the embedded controller 102 includes a central processing unit ("CPU"), at least one static or random access memories, at least one port that permits connection of one or more external memories or data storage devices. For illustrative purposes, the CPU may include an ARM-based microprocessor, RISC microprocessor, or other such microprocessor suitable for the intended purpose.

The illustrative embedded controller 102 comprises one or more local device and network connectivity modules for communication using wired, wireless, near-field communications (NFC), other electromagnetic, fiber optic, other optical, or other communication means and/or protocols, including but not limited to USB (X).(Y), the proprietary Standard Peripheral Communication ("SPC") protocol used in certain gaming devices, RS-232, RS-422, RS-485, IEEE 1394, wired Ethernet, Wi-Fi, 802.1(x)(y) compliant methods, Bluetooth™, infrared, optical, radio frequency, CDMA, GSM, GPRS, satellite, and the like. The network communication modules may include one or more ports enabled and associated with the network communication modules. The embedded controller may be configured to provide multiple ports that are simultaneously active using different protocols, multiple instances of the same protocol, or any combination thereof.

The illustrative embedded controller 102 operates under the control of an operating system such as, but not limited to, one based on the open-source Linux kernel with appropriate device drivers and other software necessary to securely implement transactional functionality presented herein. More generally, the embedded controller 102 may operate with any other suitable operating system based on open-source or proprietary software or firmware.

In the illustrative embodiment, the printer box 106 houses the embedded controller 102, the wireless communication module 110, the printer 104 and the power supply 112. In the illustrative embodiment, the printer box 106 is disposed below an illustrative table game 120. The illustrative printer box 106 provides a single semi-portable enclosure.

In the illustrative embodiment, the printer box 106 provides a single enclosure or housing that includes the embedded controller 102 that is communicatively coupled to a dedicated printer 104. The embedded controller 102 and printer 104 communicate via a local communication protocol such as, but not limited to, RS-232, USB(X).(Y), SPC, RS-422, RS-485, IEEE 1394, or the like. By way of example and not of limitation, a protocol conversion interface or controller board may be utilized between the embedded controller 102 and the dedicated printer 104 to establish a secure data communication path between the two devices utilizing available or desired ports in each one. The dedicated printer includes any device suitable for generating a printed record operating as an indicia of value.

The illustrative printer box 106 may be quickly and easily relocated within an establishment as desired. A gaming property, such as a casino, may deploy such printer boxes 106 in locations where there is a demand for the transactional system and methods presented herein. Since the printer boxes 106 are semi-portable systems, the printer boxes 106 may be moved around to any location that has suitable AC power.

The illustrative embedded controller 102 and the dedicated printer 104 operate directly from conventional 120V AC power. One or more transformers, power supplies, power converters, or any suitable combination thereof are supplied and configured between the devices and the source of 120V AC power to provide power to the two devices with the required voltage and current availability for proper operation. Such combination of transformers, power supplies, and power converters may provide regulated or unregulated power to the devices.

An illustrative power supply 112 includes a 24V power supply unit that powers the printer 104. Additionally, the power supply includes a 25V to 5V voltage converter that powers the embedded controller, which in turn powers the wireless communication module 110. The illustrative EFT terminal 108 is a wireless device that is powered by a rechargeable battery.

The embedded controller 102, the dedicated printer 104, or the combination thereof operate for a limited period time utilizing a source of stored energy, such as an uninterruptable power supply ("UPS"), other battery configuration, charged capacitive storage device, or the like. Such stored energy devices charge automatically from an 120V AC power source when such power is available, but in the event of any interruption in such source, either or both device(s) continue to operate for a limited period of time using the stored energy. This is particularly advantageous to permit completion of any EFT in process at the time of an interruption in the commercial power service or if the subsystem should become inadvertently disconnected from AC power.

In the illustrative embodiment, the embedded controller 102 has a limited number of secure connections to other devices, thus a firewall is not required between the embedded controller 102 and the securely connected devices. Also, the illustrative embedded controller 102 constantly monitors and automatically detects any disconnection(s) and attempted reconnection(s). If any of the data connections are disconnected or otherwise inoperative, no transactions may be processed by the transactional system and method. For example, the embedded controller 102 securely communicates with the EFT terminal 108, the banking gateway 118 and the server 114 without the need for a firewall.

Alternatively, at least one firewall may be disposed between the embedded controller and at least one of the data connections including, but not limited to, the EFT terminal 108, the banking gateway 118 and the server 114; and the type of firewall is dependent on the type of data connection.

The embedded controller 102 is also communicatively coupled to a wireless device. In the illustrative embodiment, the wireless device is an Electronic Funds Transfer (EFT) terminal 108 that uses a wireless connection such as an IEEE 802.11 (WiFi), IEEE 802.15 (Bluetooth/Zigbee) or other such wireless communication standard. The process of generating a secure communication between the embedded controller 102 and the EFT terminal 108 is performed by an EFT software module 115 communicating with an embedded controller software module 116. In the illustrative embodiment, the EFT software module 115 is configured to present the illustrative end user, e.g. casino patron, with user instructions.

More specifically, the illustrative EFT terminal 108 is a Blue Bamboo P200, which includes a PCI certified receipt printer, a PIN pad, an NFC contactless solution, an LCD display, an EMV card reader and a mag stripe card reader. The EMV card reader is compatible with the EMV global standard for authentication of credit and debit card transactions. The EFT terminal 108 may also include a payment card industry (PCI) and pin entry device (PED) certified device.

The Blue Bamboo P200 or other such compatible device includes proprietary software 115 that may be embodied as a STIPlet that conforms to the Global Platform Small Terminal Interoperability Platform (STIP) standard. The pre-encrypted data sent between the STIPlet or comparable application running on the EFT terminal 108 and the custom proprietary software application 116 running on the embedded controller may be encoded using a proprietary format. Even if the encryption of the data is broken, the plaintext format of the data will still be unknown. Alternative devices are configured to provide similar functionality as the STIPlet with a combination of firmware and software that operates on a device configured to perform the functions presented herein.

The wireless device, e.g. EFT terminal 108, includes a hardware module (not shown) that supports secure wireless communication using wireless communication protocols such as Bluetooth, Zigbee, Wi-Fi and other such wireless communication protocols. Additionally, the embedded controller 102 is communicatively coupled to a wireless communication module 110, which is also configured to support secure wireless communication using wireless communication protocols such as Bluetooth, Zigbee, WiFi and other such wireless communication protocols.

More generally, the wireless device 108 may comprise a central processing unit ("CPU"), one or more static or random access memories, and one or more ports to permit connection of one or more external memory or data storage devices. The wireless device may further include a point-of-sale (POS) personal identification number (PIN) entry keypad and one or more displays or display devices. The wireless device may include a payment card reader that may be a smart card reader, a magnetic card reader, a high-capacity optical storage media reader, a bar code, QR code, or other optical data storage reader, a punch card reader, a Braille reader, a contactless card reader, a proximity mobile payments reader that enables communication with smart phone devices, a contactless proximity card reader that processes secure smart ticketing and electronic payments using contactless secure mobile commerce technology, or any other device or system which retrieves information stored on or in a payment card or its functional equivalent. The wireless device may include one or more network connectivity modules for communication using wired, wireless, near-field communications (NFC), other electromagnetic, fiber optic, other optical, or other communication means and/or protocols, including but not limited to Wi-Fi, 802.1(x)(y) compliant methods, Bluetooth™, infrared, optical, radio frequency, CDMA, GSM, GPRS, and satellite.

The network communication modules may include one or more ports enabled and associated with the network communication modules. Network connectivity may be achieved by the wireless device via any one or combination of several communication modules and communication modes based on operational situations. For example, the wireless device may communicate via a wired network using the appropriate wired communication module while the wireless device is placed in a wired connectivity cradle equipped with access to a wired network and the appropriate connector(s) to operatively communicate with a wired communication module port. When the wireless device is removed from the wired connectivity cradle, the wireless device may be switched from a wired communication mode to a wireless communication mode via activation and deactivation of the appropriate communication modules. The switch from wired to wireless communication mode may be performed automatically by software or firmware running on the wireless device or performed manually at the direction of a user. Similarly, the wireless device may automatically select or be manually instructed to utilize one of several available communication modules and modes to use based on operational factors such as, but not limited to, availability of service, signal strength, security considerations, available bandwidth, link reliability, and the like by activating desired communication module(s) and deactivating others. The wired connectivity cradle may also comprise a wireless access port operatively connected to the wired network and accessible by a wireless communication module in one or more wireless devices, thereby providing a localized point of network access for one or more wireless devices in a gaming environment within which the electromagnetic spectrum may be highly congested and radio frequency interference is prevalent. The wireless device may comprise a printer and/or a printer port for connection of an external printer or a plurality of printers connected to a plurality of gaming devices via wired, wireless, or other communication means. The wireless device may be powered by alternating current, direct current, battery, stored charge, solar, or any other known power source available at the point of use. Wireless devices powered by stored energy sources may be periodically recharged from other power sources, including but not limited to charging a stored energy source when the wireless device is placed in a special cradle that may provide wired network connectivity as described above in addition to power charging capability.

In the illustrative embodiment, the embedded controller 102 does not perform payment functions; the payment functions are initiated by the EFT terminal 108. The embedded controller 102 securely transmits the requests from the EFT terminal 108. Since the embedded controller does not perform the payment function of generating the EFT request, there is little or no risk of a security breach resulting from the embedded controller 102 initiating a payment transaction. Thus, the wireless device, e.g. embedded controller 102, securely communicates a plurality of transactional data to the controller, wherein the transactional data corresponds to the transaction initiated by the wireless device.

The embedded controller 102 is also communicatively coupled to a "payment gateway," which is referred to more specifically in this illustrative embodiment as the banking gateway 118. For purposes of this patent, the terms "payment gateway" and "banking gateway" are used interchangeably, however, in general the term "banking gateway" refers to the illustrative casino table embodiment and "payment gateway" refers to the more general embodiment. The payment gateway is configured to communicate with at least one financial network. Additionally, the payment gateway is configured to receive an authorization request, which is associated with an approved transaction.

A payment gateway software module, e.g. banking gateway software module 119, resides in the banking gateway 118 and includes proprietary software that communicates with the embedded controller 102. In the illustrative embodiment, the embedded controller 102 is communicatively coupled to a banking gateway API using a secure network communication protocol. The banking gateway 118 is communicatively coupled to one or more financial networks, including but not limited to the PLUS, STAR, CIRRUS, INTERLINK, MONEY PASS, or NYCE networks, that provide access to the server(s) associated with patrons' financial accounts.

By way of example and not of limitation, the embedded controller 102 is communicatively coupled to the banking gateway 118 using a wired Ethernet (TCP/IP) that employs an illustrative security protocol such as HTTPS utilizing SSL/TLS. Other security protocols may also be used. The HTTPS protocol provides authentication and protects the privacy and integrity of the exchanged data.

In the illustrative embodiment, the banking gateway software module 119, which resides in the banking gateway 118, includes proprietary software controlled by the banking gateway 118. More specifically, the banking gateway software module 119 includes a payment gateway API that is proprietary to at least one specific payment gateway service. In an alternative embodiment, the banking gateway 118 does not include the banking gateway software module 119; thus, the banking gateway 118 represents an external service associated with, but not controlled by, the transactional system.

In operation, the embedded controller 102 connects to and exchanges data with the external banking gateway 118. The transaction is initiated with an outbound EFT request, which is associated with a patron interacting with the wireless EFT terminal 108. Applicable data is forwarded from the wireless terminal 108 to the embedded controller 102, which is then sent to the banking gateway 118 and then to the appropriate financial network associated with the institution or other entity that manages and controls the patron's account. The result of the processed EFT request from the institution or entity is conveyed back to the banking gateway 118 via the financial network and then back to the embedded controller 102 for further disposition.

More generally, the payment gateway is communicatively coupled to the controller. The payment gateway securely communicates with at least one financial network. The controller securely communicates the received transactional data to the payment gateway. The controller then receives an authorization response from the payment gateway for an approved transaction. The controller communicates the authorization response to the wireless device, which presents a receipt for the approved transaction at the wireless device. Additionally, the controller communicates the authorization response to the printer, which generates a printed record operating as an indicia of value that corresponds to the transaction initiated by the wireless device. The printed record operating as an indicia of value is converted to at least one casino chip at the table game.

In yet another embodiment, the payment/banking gateway also acts as a gaming regulatory gateway and adheres to limits, rules and standards that are set forth in accordance with specific gaming jurisdictions. The gateway may or may not handle rules and limits for more than one instance of the product simultaneously, such as handling rules of jurisdiction one for site one and rules of jurisdiction two for site two. The gateway makes initial determinations based on these limits, rules and standards about whether a transaction should be processed and sent on to the financial network or rejected without being sent.

The payments gateway also has the ability to apply business based logic rules to initiated transactions. These parameters will determine the optimal transaction routing through the payment networks and can also determine whether or not to deny transactions based on pre-determined criteria.

Figure 2:
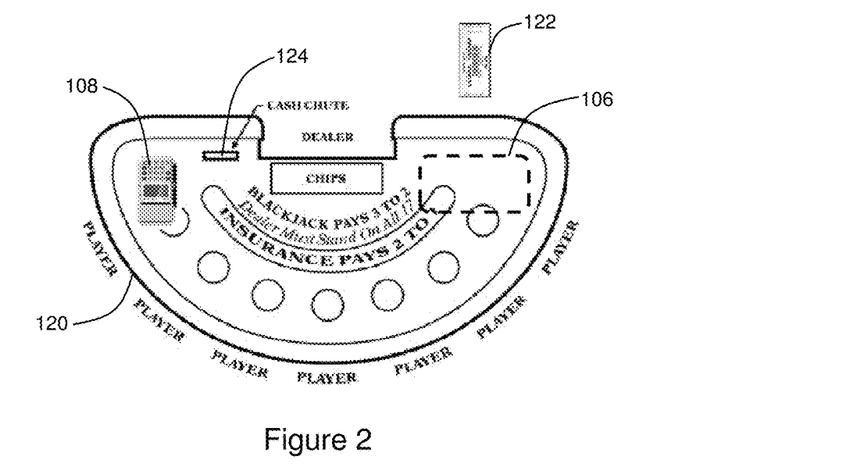
FIG. 2 shows a table game that includes the transactional system.

Referring to FIG. 2, there is shown an illustrative table game 120 that includes the transactional system 100. As described herein, the embedded controller 102 is wirelessly coupled to the wireless EFT terminal 108, which presented on the surface of the table game 120.

The illustrative table game 120 is a Blackjack table. In table game 120, the printer box 106, which includes the embedded controller 102 and printer 104, is located below the table game 120. The table game also includes a wireless EFT terminal 108 that can be provided to players electing to make a debit transaction.

When a transaction is approved, the printer 104 generates a printed record operating as an indicia of value 122 that is received by the dealer. The dealer then provides the player with the appropriate number of chips. The dealer then takes the printed record operating as an indicia of value 122 and places it within the cash chute 124. Thus, the cash chute 124 receives cash and the printed record operating as an indicia of value 122 printed by the printer box 106.

The printed record operating as an indicia of value may contain alphanumeric text, symbols, holographic images, lenticular imagery, codes, images, fully or partially punched holes or other voids, intentional edge irregularity, Braille inscription, other intentional surface irregularities, promotional material, advertising material, other material or information depiction, or any combination thereof.

In the illustrative embodiment, the printed record operating as an indicia of value includes a ticket compatible in size and data format with the ubiquitous ticket-in, ticket-out ("TITO") standard widely utilized in casino gaming systems. In another embodiment, the printed record operating as an indicia of value is compatible with re-writable data cards also known in the casino gaming industry. In yet another embodiment, the printed record operating as an indicia of value includes an article printed on paper or any other substrate media of desired composition and in any desired dimension or format as may be required to accommodate the establishment's preferred method of redemption.

In yet another embodiment, in lieu of providing the printed record operating as an indicia of value to an attendant of the establishment, the transactional system may issue an electronic credit to the establishment on behalf of the player. The value of the authorized electronic credit would then be remitted to the patron by an attendant of the establishment in some manner advantageous to the patron, including but not limited to cash, gaming chips, game play tokens, merchandise, services, or the like. The value may be remitted to the patron in any combination of the forms described above or in any other form desired by or acceptable to the patron, which collectively equals the value of the authorized electronic credit. As with the printed record operating as an indicia of value, the electronic credit is not dispensed directly to the patron but to the establishment or a designated attendant thereof for redemption and subsequent remittance to the patron.

Figure 3:
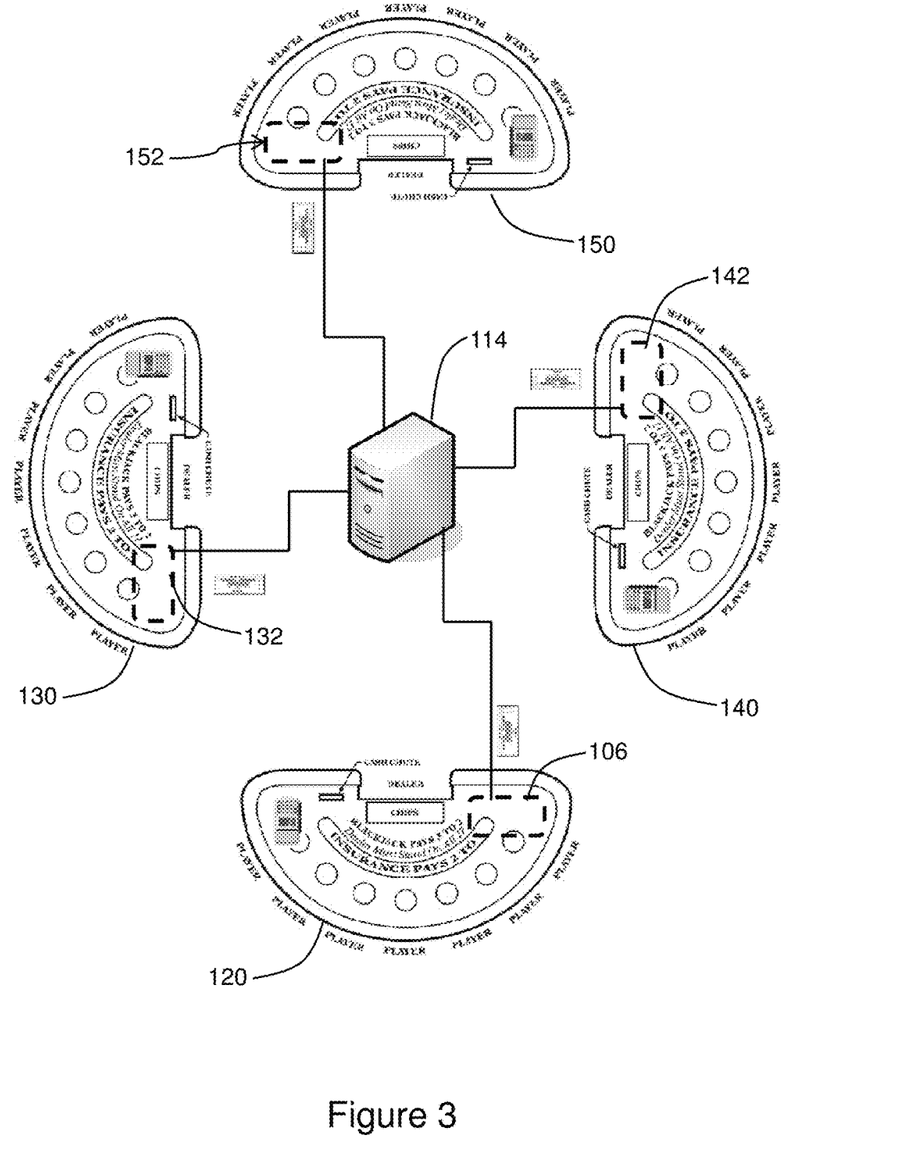
FIG. 3 shows a plurality of table games communicatively coupled to the server, in which each table game includes the transactional system.

Referring to FIG. 3, there is shown a plurality of table games communicatively coupled to server 114, in which each table game includes the transactional system 100. More specifically, the table games 120, 130, 140 and 150 each include a printer box 106, 132, 142 and 152, respectively, which are communicatively coupled to server 114. In an alternative embodiment, a plurality of servers may also be communicatively coupled to a plurality of table games. The table games 120, 130, 140 and 150 are typically associated with a particular location in a casino property.

Figure 4:
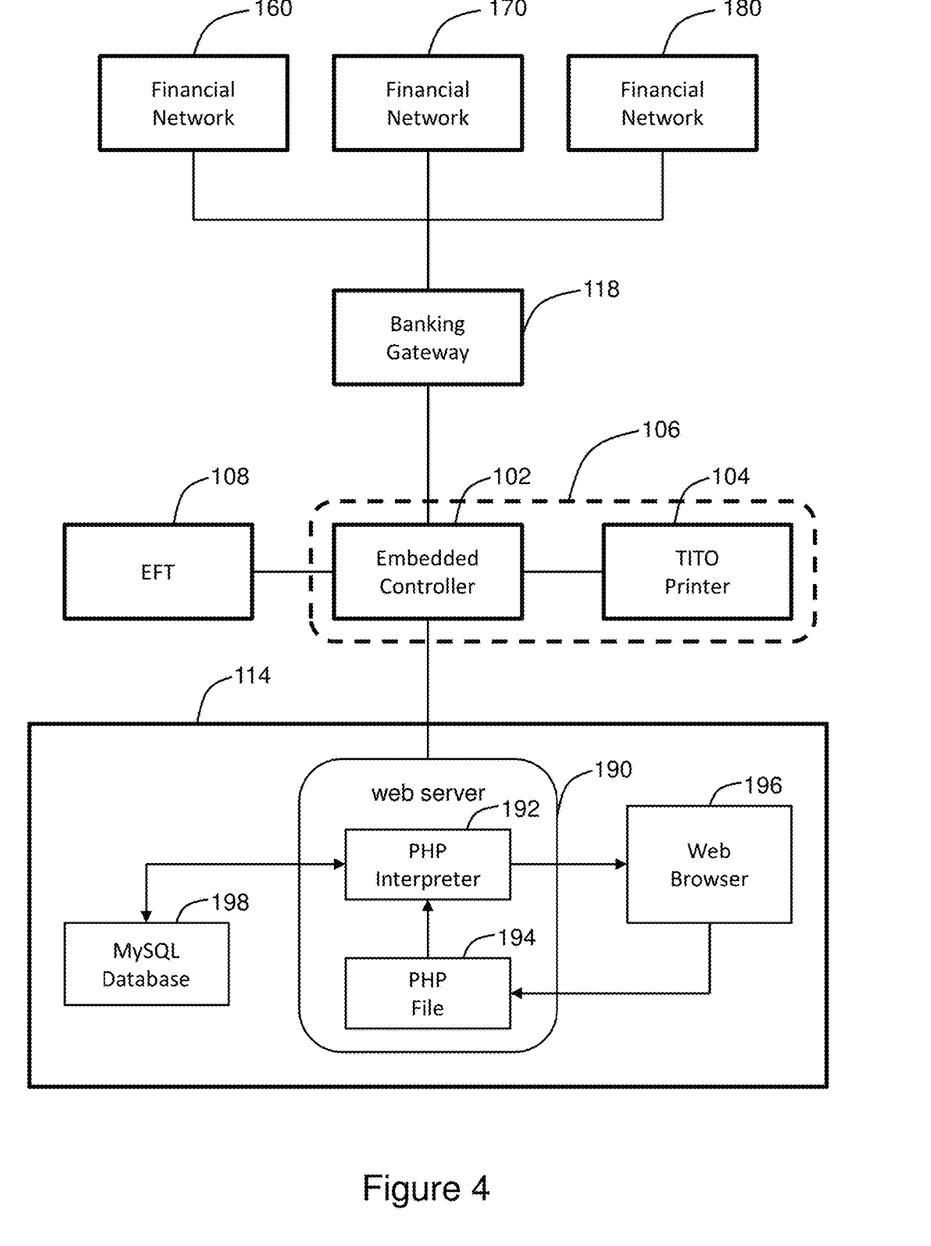
FIG. 4 shows a more detailed view of illustrative software modules associated with the server.

Referring to FIG. 4, there is shown a more detailed view of the illustrative software modules corresponding to the server 114. In the illustrative embodiment, the server 114 runs a Linux based operating system that includes an Apache web server 190, a PHP interpreter 192 and a mySQL relational database 198.

In the illustrative embodiment, PHP is server-side scripting language, which is interpreted on the web server 190 before a webpage is sent to a web browser 196 to be displayed on an administrator's client device. More specifically, the administrator accesses the web browser 196 and requests a dynamic PHP webpage file 194. The web server 190 recognizes the .php extension associated with the PHP webpage request 194 and passes the PHP file to the PHP Interpreter 192. The PHP Intepreter 192 then passes a SQL query to the MySQL database 198, which returns results for the PHP Interpreter 192. The PHP Interpreter 192 then produces a dynamic webpage that is displayed on the web browser 196. Alternatively, the server may use a Windows operating system running .NET tools and an MS-SQL relational database.

More generally, the server 114 may comprise standard computing hardware including a CPU, one or more static or random access memories, one or more magnetic or optical data storage devices, and one or more ports to permit connection of one or more external memories or data storage devices.

In another embodiment, the MySQL database may be embodied in a database server that is communicatively coupled to a web server. Authorized users may access the SQL database resident on the database server via HTTPS or other secure connection using conventional computing hardware via the web server.

In yet another embodiment, the database may be communicatively coupled remotely, via a secure SSL/TLS data path, or locally, via a secure local connection to a web server. Alternatively, the database server and web server may be combined in a consolidated server facility. System administrators, financial reconciliation or customer service personnel associated with the establishment, and other authorized users may access transactional system 100 data resident on database server via a secure connection to the web server. Such access may typically be provided by, but is not necessarily limited to, HTTPS connections utilizing SSL/TLS security.

Additionally, the transaction request that is initiated at the wireless EFT terminal 108 is securely processed by the transactional system 100 and transmitted to at least one of the financial networks 160, 170 and 180. In the illustrative embodiment, each financial network is communicatively coupled to one or more servers that correspond to a financial institution affiliated with the financial network.

Figure 5:
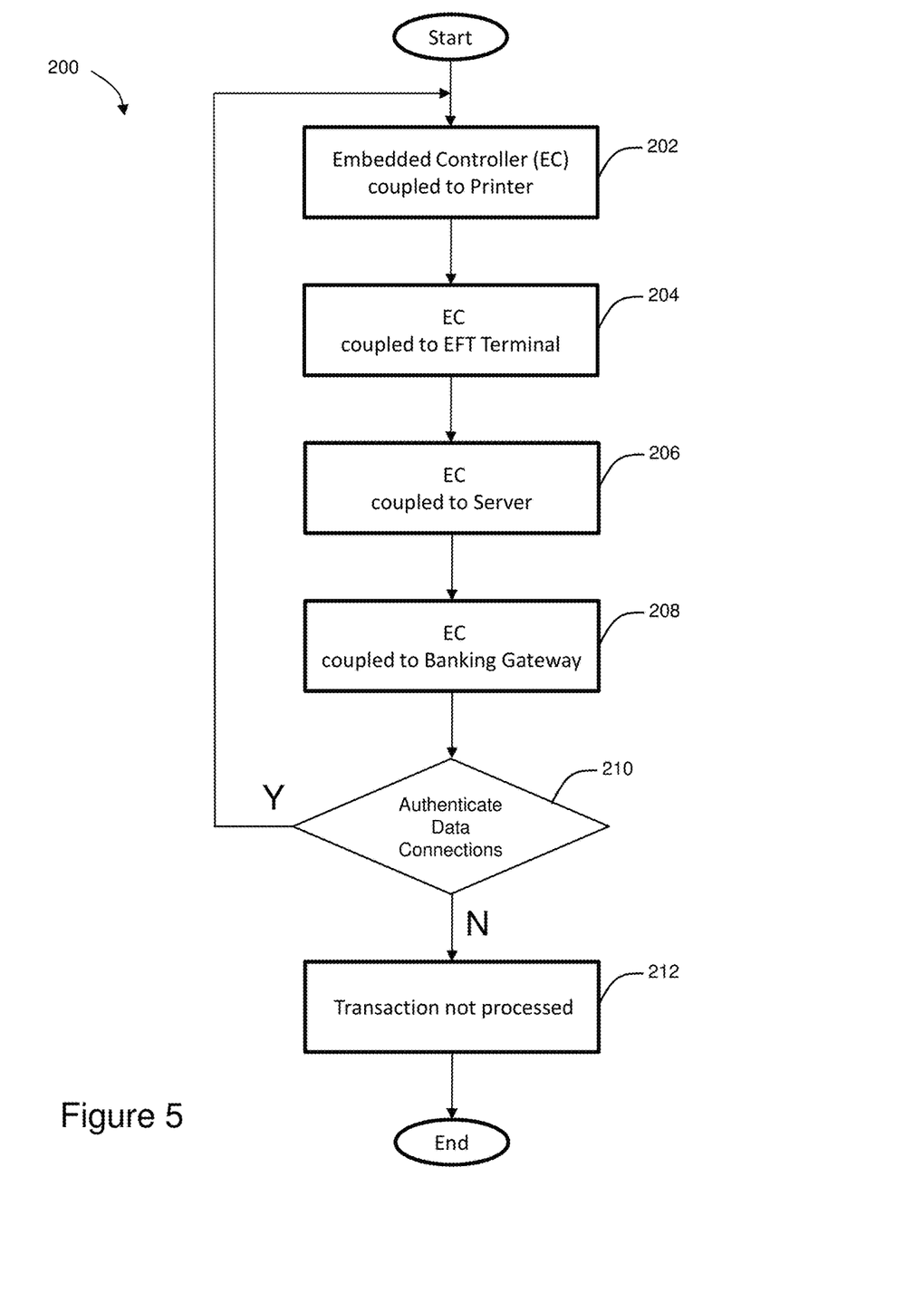
FIG. 5 shows a flowchart of the controller monitoring the data connections with the printer, EFT terminal, server and banking gateway.

Referring to FIG. 5, there is shown a flowchart 200, in which the embedded controller 102 is establishing and monitoring the data connections with the printer, wireless EFT terminal, server and banking gateway.

Custom and proprietary software running on embedded controller establishes the three secure data connections that include: 1) a secure encrypted connection with EFT terminal, in which the necessary custom and proprietary software is active and configured to begin a new transaction; 2) a secure encrypted connection with banking gateway; and 3) a secure encrypted connection with database server 113. Once all three data connections are established by embedded controller, the transactional system is considered to be online, active, and accordingly, the illustrative EFT terminal is available for a patron to initiate the EFT process.

At block 202, the embedded controller 102 is communicatively coupled to the printer 104. In the illustrative embodiment, the embedded controller 102 and printer 104 communicate via a local communication protocol such as, but not limited to, RS-232, USB(X).(Y), SPI, I2C, RS-422, RS-485, IEEE 1394, or the like. By way of example and not of limitation, a protocol conversion interface or controller board may be utilized between the embedded controller 102 and the dedicated printer 104 to establish a secure data communication path between the two devices utilizing available or desired ports in each one.

At block 204, the embedded controller 102 is communicatively coupled to EFT terminal 108. The secure data connection between the embedded controller 102 and the EFT terminal 108 is established with at least one security protocol. The secure data connection may be provided with Bluetooth™, 802.1(x)(y), IR, near-field communication, or any other suitable wired or wireless two-way communication protocol. Security for the data exchanged between the EFT terminal 108 and the embedded controller 102 may be obtained via use of any secure encryption protocol such as AES-256, other private key encryption methods, public key infrastructure ("PKI") methods, HTTPS, SSL, TLS, and other such security encryption protocols.

In the illustrative embodiment, there are three security operations performed to manage and control communications between the embedded controller and the EFT terminal 108. The three security operations also provide device authentication.

The first security operation uses the Bluetooth PIN to pair the EFT terminal 108 and the embedded controller 102. More specifically, the EFT terminal 108 accepts Bluetooth™ connections from devices having a known PIN. A PIN is required to establish the data connection between the EFT terminal 108 and the embedded controller 102. In the illustrative embodiment, the only device permitted to connect to the EFT terminal 108 via Bluetooth™ using the known PIN is the embedded controller 102.

The second security operation uses encryption to secure the communications between the EFT terminal 108 and the embedded controller 102. By way of example and not of limitation, the second security operation uses AES-256 encryption. AES-256 operates using a single private key, which is shared between the EFT terminal 108 and the embedded controller 102.

The third security operation uses a proprietary security format. The illustrative proprietary security format may use packet length and a checksum function or checksum algorithm. The illustrative checksum functions are related to hash functions, fingerprints, randomization functions and cryptographic hash functions.

In one illustrative embodiment, the EFT terminal 108 sends encrypted data using AES-256 encryption or PCI compliant Derived Unique Key Per Transaction (DUKPT) encryption, including all data containing patrons' PIN information.

At block 206, the embedded controller 102 is communicatively coupled to server 114. The embedded controller 102 is configured to connect to a database or database server, which provides logging, accounting, transactional management and reconciliation services. In the illustrative embodiment, the embedded controller 102 is also communicatively coupled to server 114 with a Secure Socket Layer (SSL) connection. As previously described, authorized users may access the SQL database resident on the server via HTTPS or other secure connection using conventional computing hardware via the web server. The database may be communicatively coupled remotely, via a secure SSL/TLS data path, or locally, via a secure local connection to web server.

At block 208, the embedded controller is communicatively coupled to the banking gateway 118. At least one proprietary software application runs on the embedded controller 102. By way of example and not of limitation, the proprietary software applications may include one or more application programming interface(s) required to access the banking gateway and financial networks(s) through which EFT requests will be submitted and processed.

The method then proceeds to decision diamond 210, in which the data connections are monitored and authenticated. More specifically, the embedded controller 102 and the data connections with the EFT terminal 108, the banking gateway 118 and the server 114 are constantly monitored. If a disconnection of the data connection is detected, then the transactional system 100 automatically attempts to reconnect.

If any of the connections between the embedded controller 102 and the EFT terminal 108, the banking gateway 118 and the server 114 are disconnected, then the method proceeds to block 212 and transactions cannot be processed.

The custom and proprietary software running on the embedded controller continually performs a number of background processing functions. For example, at one second intervals, configuration information from the EFT terminal, the embedded controller, the dedicated printer, and all components and subsystems directly associated with those devices are read from the database server. Such data may include the name of the establishment, transaction fee amounts, and the like. If any configuration changes are identified, the custom and proprietary software running on embedded controller reconfigures any or all such data on the devices. Additionally, the status of the EFT terminal is also monitored, and in the event the of connectivity or hardware failure, a connection to a replacement EFT terminal may be initiated.

The embedded controller is also configured to perform other background processing functions including monitoring the connection to database server and reestablish the connection if required. The embedded controller also requests the status of dedicated printer over the appropriate connection port, such as RS-232, to determine such factors as whether the printer is online or offline, the availability of sufficient paper in the printer, the presence of any paper jams or other adverse mechanical conditions, and the like. Additionally, the embedded controller monitors the Bluetooth™ connection to EFT terminal by polling the EFT terminal; if no reply is received within a predetermined time, then the EFT terminal is either not present, not functional, or not within the required range of approximately 10 meters. Furthermore, the embedded controller monitors the transaction database table resident on database server 113 for transactions that need to have printed record operating as indicia of value, such as tickets, or patron receipts reprinted.

Further still, the embedded controller waits for transaction initiation requests from the EFT terminal.

Figure 6:
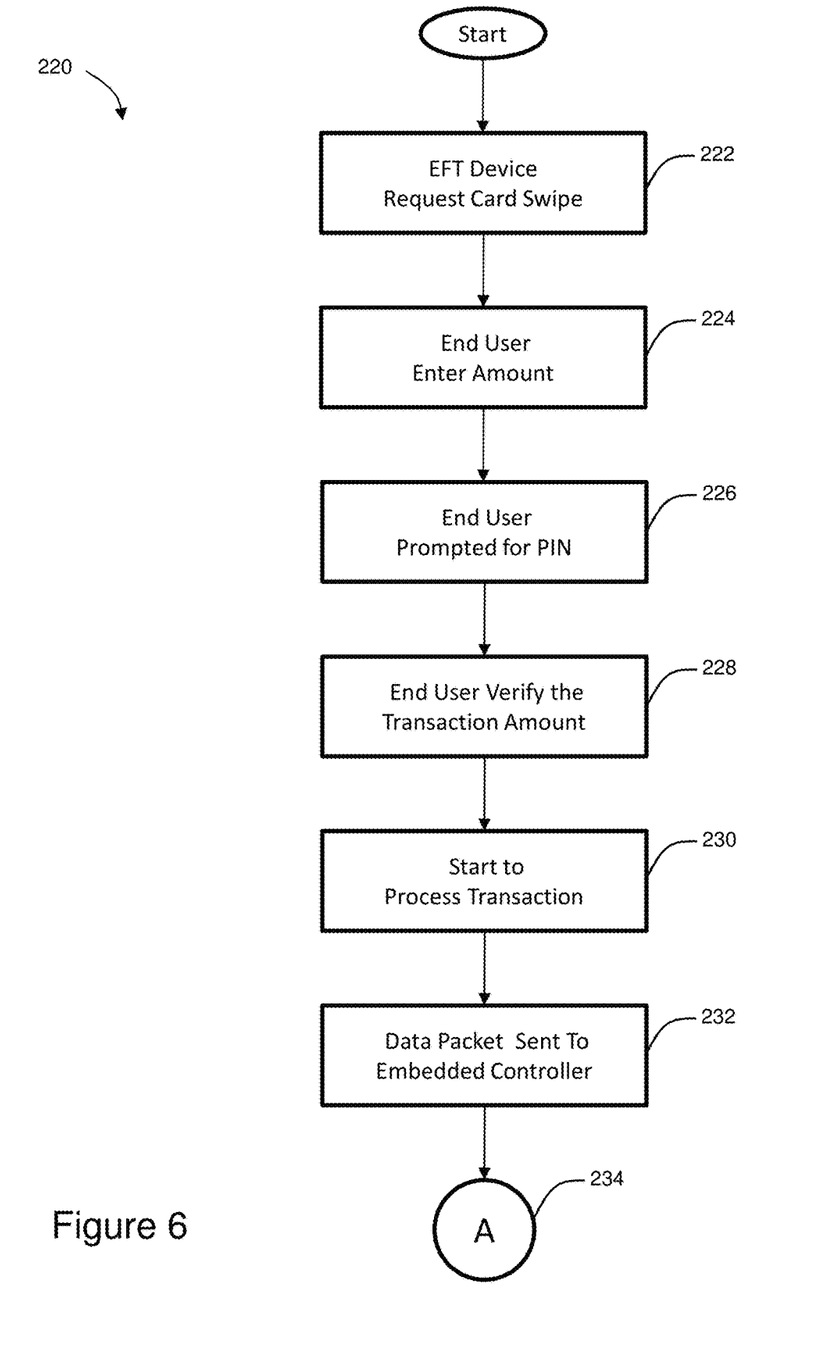
FIG. 6 shows a flowchart of the steps for initiating a transaction with the EFT terminal.

Referring to FIG. 6, there is shown a flowchart of a method 220 for initiating a transaction with the EFT terminal 108. The method is initiated at block 222 where the end user, e.g. casino patron, interacts with the wireless EFT terminal 108 with an electrically encoded card. By way of example and not of limitation, the electrically encoded card is a magnetically-encoded card, e.g. a debit card.

In the illustrative embodiment, the end user obtains funds by swiping the user's electrically encoded card, which is associated with the user's banking account, and enters information necessary to authenticate, define, and accept any associated terms of the transaction. The term "electrically encoded card" refers to any card or physical token that can be electrically encoded such as a smart cards, chip-based cards, mobile payment systems (e.g. Apple Play) that include a mobile device such as a smartphone, a magnetic strip card, and other such electrically encoded card, Note, in this patent, the magnetically-encoded card is also interchangeably referred to as a magnetic stripe card or "mag stripe" card.

For example, the custom and proprietary software running on wireless EFT terminal displays and instructs the illustrative casino patron via an embedded display to the effect "Swipe Card to Begin". After the patron has swiped a card associated with an account which he owns or is authorized to access, he is then instructed to "Enter an amount."

Other technologies may be used in a manner similar to the electrically encoded card to initiate a transaction that transfers funds. For example, transactional smart card(s), RFID tag(s), secure electronic memories, near-field communications, optical media, multi-factor authentication, X.509 certificate authentication, physical biometric data, behavioral biometric data, character or pattern recognition data, alphanumeric login/password authentication, and the like may be used in lieu of the electrically encoded card. These illustrative examples are intended to be representative of the flexibility of the system disclosed herein and are not limiting in any way. It is envisioned that new and improved systems and methods of electronic commerce identification and authentication may be adapted or integrated with the transactional system and method presented herein.

In another illustrative embodiment, the transactional system may issue an electronic credit to the establishment on behalf of the player. The value of the authorized electronic credit would then be remitted to the end user, e.g. casino patron, by an attendant of the establishment in some manner advantageous to the patron, including but not limited to cash, gaming chips, game play tokens, merchandise, services, or the like. The value may be remitted to the patron in any combination of the forms described above or in any other form desired by or acceptable to the end user, e.g. casino patron, which is collectively equal to the value of the authorized electronic credit. As with the printed record operating as an indicia of value, the electronic credit is not dispensed directly to the patron but to the establishment or a designated attendant thereof for redemption and subsequent remittance to the patron.

The method then proceeds to block 224 where the end user, e.g. casino patron, enters the amount to withdraw. By way of example and not of limitation, the amount is checked by the EFT terminal software for validity (too low, too high, zero), and if the requested amount is acceptable, the patron is then prompted to enter the PIN associated with the chosen account. The PIN data is received directly by the secure PCI-compliant software embedded in EFT terminal and is immediately secured via DUKPT encryption. In the illustrative embodiment, no other software or applications running on EFT terminal are granted access to the illustrative patron's encrypted PIN data.

At block 226, the end user is prompted for a Personal Identification Number (PIN), which is typically associated with a debit card. The method then proceeds to block 228, where the end user verifies the transaction amount, the processing fee, convenience fee or other such fee associated with the transaction. The amount or rate of the fee may be shown to the patron in advance to comply with regulatory requirements pertaining to consumer financial transactions.

For example, following the successful receipt and encryption of the PIN data, the transaction fee is calculated by the custom and proprietary software running on EFT terminal based on data obtained from an SQL database resident on the illustrative database server. In this illustrative embodiment, the transaction fee is comprised of two components: 1) a fixed fee amount, and 2) a fee percentage. Both amounts are calculated based on the requested amount of the transaction amount and added together; fractional cents are always rounded down.

After the end user accepts the transaction and associated fee the method proceeds to block 230. At block 230, the transaction is processed.

In the illustrative embodiment presented herein, the wireless EFT terminal 108 is a portable or fixed device is provided to a patron to initiate and direct the processing of an EFT. Alternatively, the EFT terminal may be a mobile phone, a smartphone, a personal digital assistant (PDA), a payment module, a portable computer, a personal computer, a server, or any other suitable computing circuit or device.

At block 232, an appropriate data packet corresponding to the transaction is generated by the EFT terminal. The data packet is then communicated from the wireless EFT terminal 108 to the embedded controller 102 using a security communications protocol as described previously.

The method for initiating a transaction permits end users, e.g. casino patrons, to draw funds electronically from a financial account which they own or are authorized to access, provided that the account has been enabled to permit such transaction. Typically, customers of financial institutions including but not limited to banks, savings and loan associations, credit unions, and the like may obtain a debit card linked to one or more of their financial account(s) with said institution, are linked to the Visa or MasterCard authorization network, and provide direct debit capability from the account(s). Financial institutions and a multitude of other entities also issue credit cards to their customers, including but not limited to MasterCard, Visa, Discover, American Express, and the like, that are linked to a credit account in the name of the customer. Subject to the specific limitations of each such account, customers may draw funds on said account. Similarly, patrons may own one or more financial accounts managed or administered by a non-financial institution third party service. Such non-financial institution third party services may include, but are not limited to, PayPal, Amazon Payments, Google Wallet, WePay, Skrill, ProPay, and the like. All of the accounts and services named above, and any similar thereto, are envisioned by this invention and may be utilized therewith. The transactional system and method presented herein may transfer funds from any account which permits such transfer via an electronic system or method provided that the patron has properly and independently established such ability in accordance with the requirements of the account administrator(s) in advance.

Figure 7:
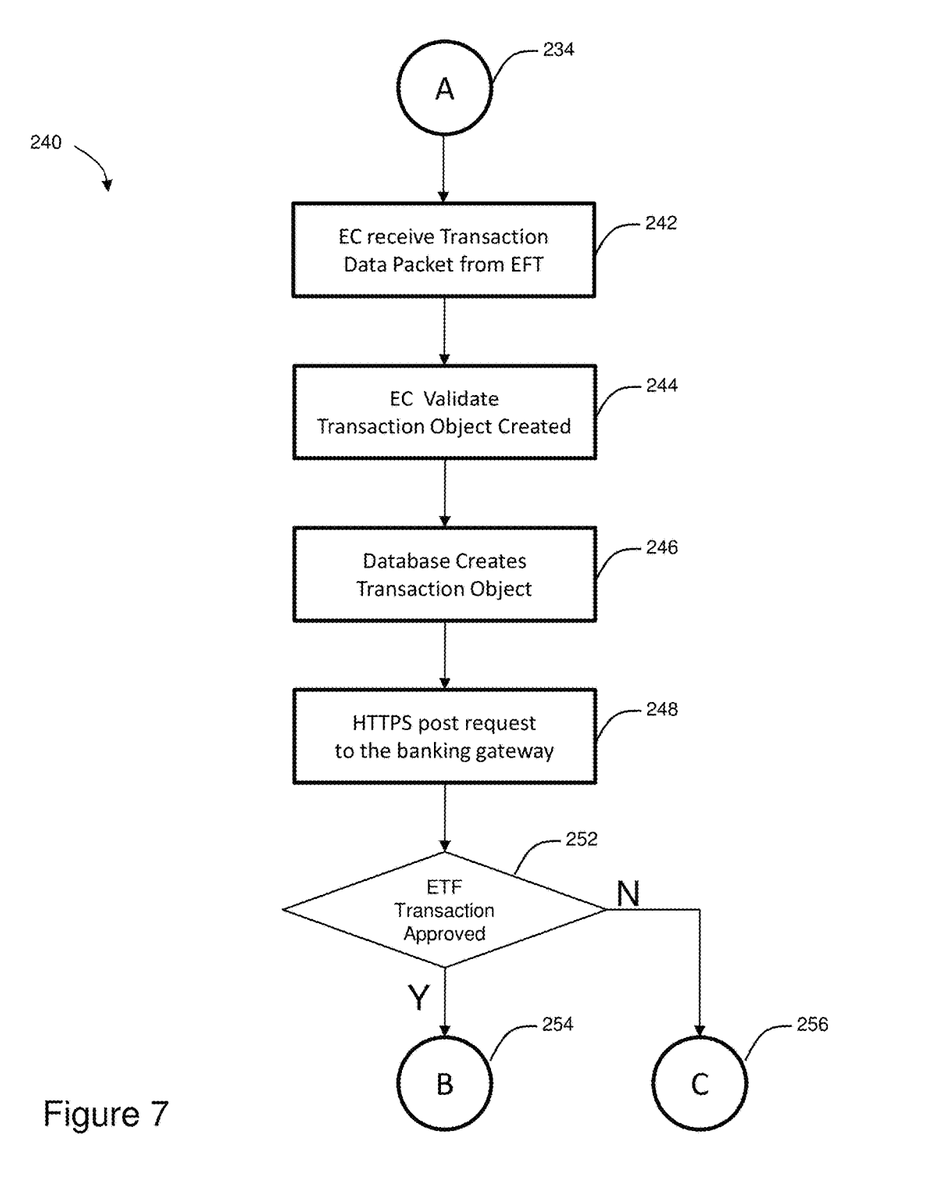
FIG. 7 shows a flowchart of the operations performed by the controller after the end user has initiated a transaction with the EFT terminal.

Referring to FIG. 7, there is shown a flowchart of the operations performed by the embedded controller after the end user has initiated a transaction with the wireless EFT terminal. At block 242, the embedded controller 102 receives the transaction data packet from the illustrative EFT terminal 108. The method then proceeds to block 244 where the embedded controller 102 validates the transaction and a transaction object is created.

At block 246, the SQL database creates a transaction object. More specifically, the illustrative MySQL database is asked to create a new transaction record that is unique to the table. The database transaction record is also initialized and assigned to the device PHP Interpreter. This allows a single database table to serve multiple devices. A timestamp is also generated on the server (using server time) to timestamp the transaction. The timestamp for the transaction is also generated on the database server using the server's internal clock for accounting and reconciliation purposes. The transaction is initialized in the database and a unique transaction number received.

Once the transaction data is placed in database, the controller then takes same data and creates the HTTPS post request and sends the HTTPS post to the banking gateway. When a response is received by controller from the banking gateway, the database record is updated with new and additional information.

The EFT request is sent to a financial network(s) via a secure data communication connection and the response is received directly from the banking gateway on the same network connection, which was made as an outgoing connection from the embedded controller. The HTTP post request includes reference fields from the SQL database that will tie the banking gateway database record back to the transactional system that originated the transaction.

At decision diamond 252, the determination is made whether the EFT transaction has been approved by the banking gateway. Once the transaction request has been processed, the results of the transaction request are provided to the system from the appropriate financial server via the established interbank and financial networks.

For example, once the response is received from banking gateway, it will be either an "APPROVED" response or a "DECLINED" response with an associated reason and reason code. All of the information from the response is stored in various fields in the transaction record in the SQL database resident on the illustrative database server. This information also includes a banking gateway reference number that now completes a relation between the SQL database resident on database server and an accounting database resident in banking gateway. Transaction processing records may now be referenced in either direction Thus, if the transaction is approved, the method proceeds to connector B 254. The steps following connector B 254 are presented in FIG. 8. And, if the transaction is declined at decision diamond 252, the method proceeds to connector C 256, in which the subsequent steps are also presented in FIG. 8.

Figure 8:
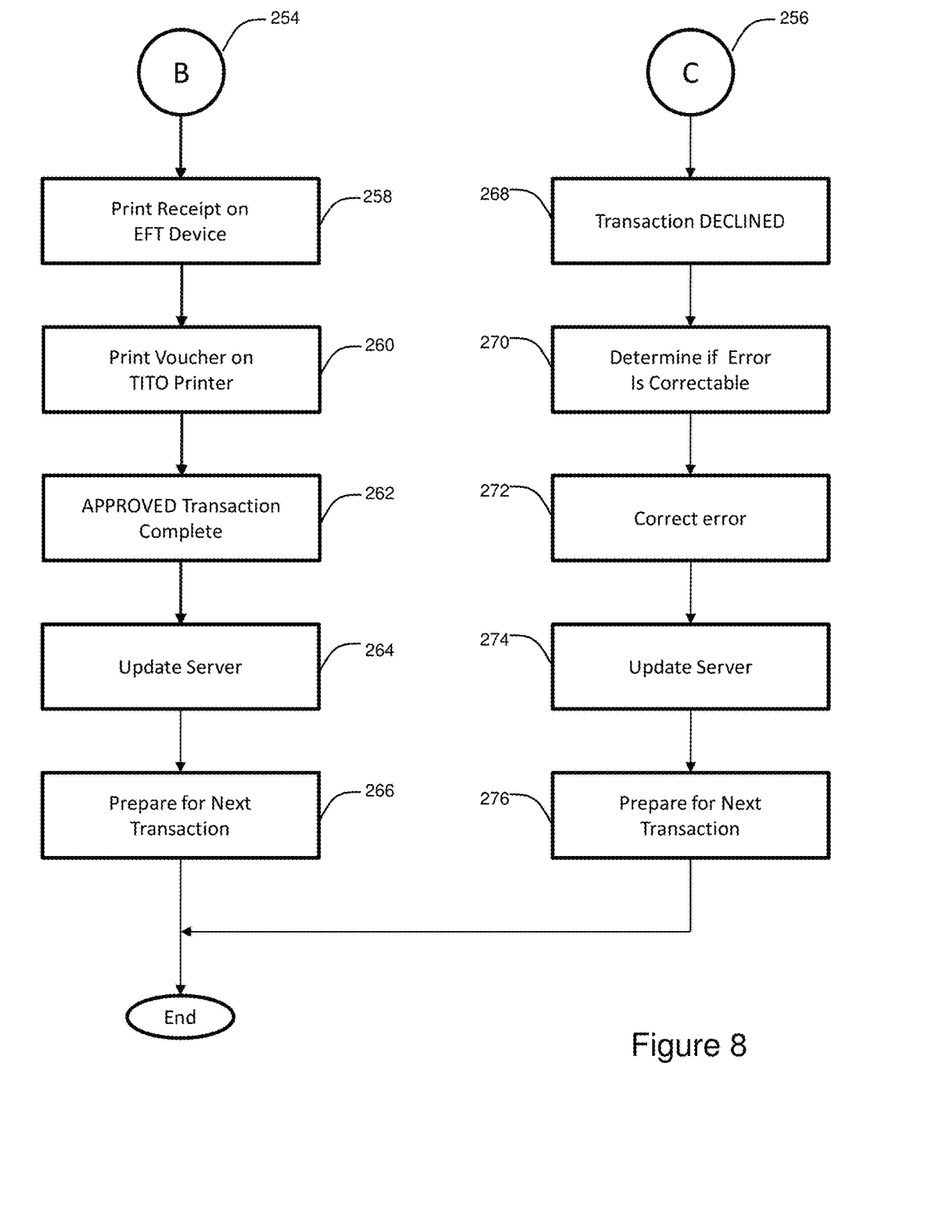
FIG. 8 shows a flowchart of steps corresponding to accepting and declining the transaction.

Referring to FIG. 8, there is shown a flowchart of steps corresponding to accepting and declining the transaction. If the transaction is approved, the transaction record is now passed to two subsequent processes, namely, block 258 and 260. At block 258, a receipt is printed for the end user, e.g. casino patron. In the illustrative embodiment, the EFT terminal prints the receipt.

At block 260, the printed record operating as indicia of value is dispensed. In the illustrative embodiment, the dedicated printer generates the printed record operating as indicia of value for the illustrative attendant. The attendant then proceeds to redeem the printed record operating as indicia of value for a physical token operating as indicia of value, e.g. casino chips or other form of value desired by the patron.

The two separate processes in blocks 258 and 260 are acting upon the single transaction record, and the transaction is not complete until both processes have completed successfully without generating an exception or other error. At block 262, the transaction is approved and completed.

For example, if the transaction has been approved, the system is configured to securely dispense a printed record operating as indicia of value to an attendant authorized by the establishment, such as the dealer or croupier at a gaming table, wherein the printed record operating as indicia of value is not provided to or in the possession of the patron. The attendant then redeems the printed record operating as indicia of value for the patron, providing the authorized amount of the transaction to the patron in the desired negotiable form. In one embodiment well-suited to wager-based table games, the attendant provides the patron with casino chips for use in the table game. Once the printed record operating as indicia of value has been redeemed for the patron by an attendant in this manner, it is retained by the establishment to be reconciled with the corresponding electronic transfer of funds to be credited to its own account from the financial institution which approved the transfer. Typically, the printed record operating as indicia of value is placed in the cash box, cash drawer, or cash drop in the identical manner as cash or any other indicia of value would be handled for later reconciliation.

After the approved transaction has been completed, the approved transaction status is reported to a software-based payment state machine running on the embedded controller. At block 264, the server is then updated when the software-based payment state machine proceeds to update the transaction record in the SQL database resident on database server.

The method then proceeds to block 266, where the transactional system is prepared for the next transaction. More specifically, after the transaction is completed, all software reverts back to the initial state and waits for the next transaction.

If the transaction is declined, the method proceeds to connector 256 and the transaction is declined as described block 268. For example, if the transaction is declined, a data packet is sent to the wireless EFT terminal to inform the patron via the embedded LCD display that the transaction was not approved. Additionally, if the transaction has been declined, the patron receives notification of the unsuccessful result and may be prompted to repeat the process, possibly using a different account.

The method then proceeds to block 270, where an examination of the declined transaction is performed. At block 272, the correctible error is corrected. Thus, each transaction record can be examined to determine the error, and then a determination of whether the error can either be automatically or manually corrected is made. For example, the process responsible for printing the patron's receipt via the embedded printer in EFT terminal will continue to retry to print the patron's receipt until the receipt is successfully printed.

In another illustrative example, a transaction is received and sent to the banking gateway, where the banking gateway approves the transaction; however, a response is never received by embedded controller so the transaction will timeout, leaving the transaction record in state '1' with no printed record operating as indicia of value, and a 'transaction failed' message on the user's screen. However, the banking gateway successfully charged the user's account and supplied an authorization code that will be settled in the next 24 hours. Because the banking processor has a record number stored, and that record holds the record number and system validation number, the system can scan the banking database and then cross reference back to the database for successfully charged, but since there is no printed record operating as indicia of value then the system automatically issues a 'credit' transaction to cancel the charge, and mark the transaction as 'credited'.

In a more specific illustrative example, when an error condition is generated during the printing of the printed record operating as indicia of value, a manual process is then used by an operator designated by the establishment to update the database with a ticket request which is then picked up by the custom and proprietary software running on embedded controller and a new printed record operating as indicia of value is printed. Additionally, each successful printing of a printed record operating as indicia of value increments a counter in the data base transaction record.

At block 274, the illustrative server database is updated to reflect any errors that have or have not been corrected. By way of example and not of limitation, after the transaction is declined, the appropriate errors or error corrections are reported and all software reverts back to the initial state and waits for the next transaction. The method then proceed to block 276 where the transactional system is prepared for the next transaction.

The transactional system and method described above may be used in any commercial environment that lacks an ATM and where patrons receive units of value such as casino chips or other such indicia of value. Additionally, the transactional system and method does not require the same level of physical security as is required for devices and systems that are required to retain large quantities of cash to dispense to patrons. Furthermore, the transactional system and method is lightweight and portable and permits use in a wide range of locations with none of the problems attendant to the relocation of comparably functional systems with a much larger footprint associated with ATMs and cash kiosks. Further still, the transactional system and method provides a secure, flexible, and highly configurable system.

The transactional system and method may also be utilized independently of any existing in-house data, communication, or financial network(s), including but not limited to a casino management system ("CMS"). The accounting and financial reconciliation functions of the transactional system and method are configured to be exported to, combined with, or merged into any existing or envisioned CMS provided by the establishment. However, CMS infrastructure is not required to be fully functional. Thus, the transactional system and method may be installed and operated, without the need for a CMS, an ERP system, or other such back-end systems.

The transactional system and method provides a high level of security. More specifically, the transactional system and method provides a high level of electronic security for the end user's sensitive financial information. Additionally, the transactional system and method enables authorized personnel, e.g. system administrators, to manage and monitor the system remotely using standard computing hardware. Furthermore, the transactional system and method includes modular software and hardware components that support the system functionality with secure software and firmware. Further still, the transactional system and method utilizes secure firmware and software of the various components and sub-systems, and procuring any necessary approvals will be greatly simplified when compared with a system utilizing proprietary hardware devices.

The degree of software modularity for the transactional system may easily evolve as well to benefit from the improved performance and anticipated lower cost of the required hardware components.

It is to be understood that the detailed description of illustrative embodiments are provided for illustrative purposes. Thus, the degree of software modularity for the transactional system and method presented above may evolve to benefit from the improved performance and lower cost of the future hardware components that meet the system and method requirements presented. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A transactional system for a table game comprising:
   a controller communicatively coupled to a printer, wherein the controller and printer are associated with the table game;
   a wireless device communicatively coupled to the controller, wherein the wireless device receives at least one transactional input that initiates a transaction from the wireless device;
   the wireless device securely communicates a plurality of transactional data to the controller, wherein the plurality of transactional data corresponds to the transaction initiated by the wireless device;
   a database module communicatively coupled to the controller, the database module including a transaction record that is unique to table game;
   a payment gateway that is communicatively coupled to the controller, wherein the payment gateway securely communicates with at least one financial network;
   the controller securely communicates the transactional data received from the wireless device to the payment gateway;
   the controller receives an authorization response from the payment gateway for an approved transaction;
   the controller communicates the authorization response to the database module;
   the database module stores the authorization response in association with the transaction record that is unique to the table game;
   the controller communicates the authorization response to the wireless device, which presents a receipt for the approved transaction at the wireless device;
   the controller communicates the authorization response to the printer, which generates an indicia of value that corresponds to the transaction initiated by the wireless device; and
   the indicia of value converted to at least one casino chip at the table game.

2. The transactional system of claim 1 wherein the indicia of value is a printed record operating as an indicia of value.

3. The transactional system of claim 2 further comprising a printer box that houses the printer and the controller.

4. The transactional system of claim 3 wherein the printer box is located at the table game.

5. The transactional system of claim 1 wherein the wireless device comprises an Electronic Funds Transfer (EFT) terminal that includes a card reader and a Personal Identification Number (PIN) pad, the card reader reads an electrically encoded card and the PIN pad receives a password corresponding to the electrically encoded card.

6. The transactional system of claim 5 wherein the electrically encoded card is a magnetically encoded card.

7. The transactional system of claim 1 wherein the database module securely communicates with the controller, wherein the database module logs the transactional data communicated to the payment gateway and the authorization response associated with the approved transaction.

8. The transactional system of claim 7 further comprises a server communicatively coupled to a plurality of table games, the server includes the database module and the server securely communicates with a plurality of controllers, in which each controller is associated with a table game.

9. The transactional system of claim 7 wherein the database records an approved transaction after the receipt for the approved transaction is generated at the wireless device and after the printer generates the indicia of value corresponding to the transaction.

10. The transactional system of claim 1 wherein the printer is communicatively coupled to the controller is accessible by a plurality of table games.

11. A transactional method for a table game, the transactional method comprising:
communicatively coupling a controller to a printer, wherein the controller and printer are associated with the table game;
communicatively coupling a wireless device to the controller, wherein the wireless device receives at least one transactional input that initiates a transaction from the wireless device;
securely communicating a plurality of transactional data from the wireless device to the controller, wherein the plurality of transactional data corresponds to the transaction initiated by the wireless device;
communicatively coupling a database module to the controller, wherein the database module includes a transaction record that is unique to the table game;
communicatively coupling a payment gateway to the controller, wherein the payment gateway securely communicates with at least one financial network;
securely communicating the received transactional data from the controller to the payment gateway;
receiving an authorization response from the payment gateway for an approved transaction at the controller;
communicating the authorization response from the controller to the database module;
storing, by the database module, the authorization response in association with the transaction record that is unique to the table game;
communicating the authorization response from the controller to the wireless device, which presents a receipt for the approved transaction at the wireless device;
communicating the authorization response from the controller to the printer, which generates an indicia of value that corresponds to the transaction initiated by the wireless device; and
converting the indicia of value to at least one of casino chip at the table game.

12. The transactional method of claim 11 wherein the indicia of value is a printed record operating as an indicia of value.

13. The transactional method of claim 12 further comprising housing the printer and the controller in a printer box.

14. The transactional method of claim 13 wherein the printer box is located at the table game.

15. The transactional method of claim 11 wherein the wireless device comprises an Electronic Funds Transfer (EFT) terminal that includes a card reader and a Personal Identification Number (PIN) pad, wherein the card reader reads an electrically encoded card and the PIN pad receives a password corresponding to the electrically encoded card.

16. The transactional method of claim 15 wherein the electrically encoded card is a magnetically encoded card.

17. The transactional method of claim 11 further comprising enabling the database module to securely communicate with the controller, wherein the database module logs the transactional data communicated to the payment gateway and the authorization response associated with the approved transaction.

18. The transactional method of claim 17 further comprises communicatively coupling a server to a plurality of table games, wherein the server includes the database module and the server securely communicates with a plurality of controllers, in which each controller is associated with a table game.

19. The transactional method of claim 17 wherein the database module records an approved transaction after the receipt for the approved transaction is generated at the wireless device and after the printer generates the indicia of value corresponding to the transaction.

20. The transaction method of claim 11 wherein the printer is communicatively coupled to the controller is accessible by a plurality of table games.

* * * * *